United States Patent
Dunwoody et al.

(10) Patent No.: US 6,463,764 B1
(45) Date of Patent: Oct. 15, 2002

(54) GERMANIUM-CONTAINING PARTICULATE CAPTURE FROM AN EXHAUST GAS STREAM OF A GLASS PRODUCTION SYSTEM

(75) Inventors: Steven A. Dunwoody, Castle Hayne; Eric C. Hilton, Mt. Pleasant; Richard D. Pace, Wilmington, all of NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/555,943
(22) PCT Filed: Dec. 29, 1998
(86) PCT No.: PCT/US98/27779
§ 371 (c)(1), (2), (4) Date: Jun. 6, 2000
(87) PCT Pub. No.: WO99/33756
PCT Pub. Date: Jul. 8, 1999

Related U.S. Application Data
(60) Provisional application No. 60/070,235, filed on Dec. 31, 1997.

(51) Int. Cl.[7] ............................................. C03B 37/23
(52) U.S. Cl. .................... 65/385; 65/17.4; 65/27; 65/168; 65/413; 65/503
(58) Field of Search ........................ 65/17.4, 27, 28, 65/134.6, 168, 413, 503, 385

(56) References Cited

U.S. PATENT DOCUMENTS

| | | |
|---|---|---|
| 3,737,292 A | 6/1973 | Keck et al. |
| 4,372,834 A | 2/1983 | Barns et al. |
| 4,385,915 A | 5/1983 | Amelse et al. |
| 4,432,951 A | 2/1984 | De Schepper et al. |
| 4,525,332 A | 6/1985 | Boateng et al. |
| 4,578,253 A | 3/1986 | Gill et al. |
| 4,643,110 A | 2/1987 | Lisowyj et al. |
| 4,678,647 A | 7/1987 | Lisowyj et al. |
| 4,710,278 A | 12/1987 | Polak et al. |
| 4,765,805 A | 8/1988 | Wahl et al. ..................... 55/18 |
| 4,775,479 A | 10/1988 | Shügerl et al. |
| 4,886,648 A | 12/1989 | Menendez et al. |
| 4,915,919 A | 4/1990 | Boateng et al. |
| 4,942,023 A | 7/1990 | De Schepper et al. |
| 5,051,123 A | 9/1991 | Nurmi |
| 5,069,794 A | 12/1991 | Haag et al. |
| 5,080,837 A | 1/1992 | Gyokhegy et al. ........ 261/114.1 |
| 5,178,334 A | 1/1993 | Herbert et al. |
| 5,190,735 A | 3/1993 | Phillips et al. |
| 5,277,882 A | 1/1994 | Vliegen et al. |
| 5,281,255 A | 1/1994 | Toy et al. |
| 5,304,363 A | 4/1994 | Beck et al. |
| 5,520,896 A | 5/1996 | De Graaf et al. ........... 423/240 |
| 5,536,298 A | 7/1996 | Awaji ........................... 95/35 |
| 5,741,469 A | 4/1998 | Bhore et al. |
| 5,785,741 A | 7/1998 | Li et al. |
| 5,895,521 A | 4/1999 | Otsuka et al. ................ 95/280 |
| 6,054,104 A | 4/2000 | Iankewicz et al. |
| 6,090,183 A | 7/2000 | Awaju ........................... 95/35 |
| 6,220,060 B1 | 4/2001 | Wisk et al. |

FOREIGN PATENT DOCUMENTS

| | | | |
|---|---|---|---|
| EP | 0018478 | 4/1980 | |
| EP | 0813897 | 12/1997 | ................... 46/24 |
| EP | 1 063 200 | 12/2000 | |

Primary Examiner—Christopher A. Fiorilla
(74) Attorney, Agent, or Firm—Timothy R. Krogh

(57) ABSTRACT

The invention relates to a method and apparatus for a glass manufacturing facility. The apparatus includes a glass production system providing an exhaust stream entrained with particulate material including germanium—containing particulate. The apparatus further includes an exhaust filtration system including a PTFE fabric material. The exhaust filtration system is connected to the production system to receive the exhaust stream an capture the particulate material. A collection system is connected to the exhaust system to collect the captured particulate material from the exhaust system. The particulate material collected contains at least about 2% by weight germanium. The invention further includes incorporating the aforementioned apparatus into the operation of a glass manufacturing facility.

24 Claims, 2 Drawing Sheets

GERMANIUM-CONTAINING PARTICULATE CAPTURE FROM AN EXHAUST GAS STREAM OF A GLASS PRODUCTION SYSTEM

This application is a 371 of PCT/U.S. 98/27779 filed Dec. 29, 1998, which claims benefit of provisional application No. 60/070,235, filed Dec. 31, 1997.

BACKGROUND OF THE INVENTION

FIELD OF THE INVENTION

This invention relates to production of germanium-containing glass. The invention is more particularly concerned with an improved glass manufacturing facility and method of operation, wherein germanium-containing particulate filtered from an exhaust gas stream of the glass production process is collected from a filtration system at a concentration level conducive to reclamation of the germanium.

BACKGROUND OF THE INVENTION

In the manufacture of germanium-containing glass for various advanced optical products, such as optical fibers, germanium dioxide ($GeO_2$) particulate, silicon dioxide ($SiO_2$) particulate, hydrochloric acid (HCl) fumes, and water vapor are produced as byproducts. These byproducts are exhausted to a pollution abatement system where, among other things, the $GeO_2$ and $SiO_2$ particulate are captured from the exhaust stream and collected for disposal in a landfill.

FIG. 1 is a basic block diagram of a conventional glass manufacturing facility 10 that produces germanium-containing glass. The facility comprises a glass production system 12 including a plurality of lathes 14. The lathes produce bodies of $GeO_2$-doped silica glass, commonly called blanks or preforms, using a process known as flame hydrolysis. The aforementioned byproducts are reaction products of this process.

In the lathes 14, vaporous $SiCl_4$ and $GeCl_4$ as raw materials are passed though a specially designed methane burner in precisely controlled amounts depending upon the desired constitution of the silica glass blanks. The $SiCl_4$ and $GeCl_4$ are reacted with oxygen under the heat of the burner to form minute particles or "soot" of $SiO_2$ and $GeO_2$. A portion of these particles is deposited on the outer periphery of a rotating mandrel (a technique known as outside vapor deposition or OVD) to form the glass blanks. The excess soot is exhausted from the lathes.

The respective exhausts of the lathes 14 are connected to a dedicated loop L that pulls air from the lathes by way of a loop exhaust fan 16. The fan circulates the exhaust stream to a baghouse 18, including a plurality of baghouse modules 20 (four in the form shown), for filtration of the $SiO_2$ and $GeO_2$ particulates from the stream. After filtration by the baghouse 18, a portion of the exhaust stream is recirculated through the loop and mixed with pre-heated makeup air. The non-recirculated portion of the exhaust stream is supplied, via a scrubber fan 22, to a scrubber system 24 and then discharged through an exhaust stack 26. The scrubber system 24 scrubs the filtered exhaust stream from the baghouse with weak acid or soft water to remove vapor-phase chloride components, including HCl, $SiCl_4$ and $GeCl_4$, to ensure that the discharge from the exhaust stack complies with environmental requirements.

In conventional operation of the production system 12, different types of blanks are run on individual lathes depending upon customer demand. At any given time, some of the lathes 14 may be running a low concentration of germanium, while others may be running a high concentration of germanium, with still others running at intermediate concentration. $GeO_2$ content may differ between individual blanks by as much as about 13–14% by weight, and possibly more. It will thus be appreciated that the $GeO_2$ concentration in the exhaust stream supplied to the baghouse system varies widely, depending upon the particular mix of blanks being manufactured a given time.

It should be noted, incidentally, that the earlier-described production process of the lathes 14 is merely exemplary. As is well known to those skilled in the art, the flame hydrolysis process can be implemented using materials other than those mentioned above. And soot deposition can be accomplished by other techniques such as modified chemical vapor deposition (MCVD), in which soot is deposited on the inner periphery of a rotating hollow mandrel, and vapor axial deposition (VAD), in which soot is deposited on the axial end of a rotating rod. Indeed, as shown in FIG. 1, the glass production system 12 includes additional lathes 28 that produce blanks of germanium-free silica glass, and these lathes are also connected to the loop L.

The $SiO_2$ particulate and the $GeO_2$ particulate byproducts from the lathes 14 are generally in the size ranges of 0.5–1 $\mu$m and 0.05–0.5 $\mu$m, respectively. To capture these particulates, as well as the particulates from the lathes 28, the baghouse modules 20 use acrylic filter bags 21 that are pre-coated (pre-loaded) with particulate $SiO_2$. The exhaust stream from the lathes is passed through the pre-coated bags which trap and accumulate substantially all of the particulate material entrained in the exhaust stream. Each of the baghouse modules is periodically taken off-line and isolated from the loop L in order to conduct a cleaning cycle. During the cleaning cycle, a mechanical shaking system (not shown) shakes the bags of the isolated module to dislodge the accumulated particulate material captured from the exhaust stream. The cleaned bags are then recoated with $SiO_2$ from a supply system 30 connected to the baghouse, and thereafter placed back on-line.

The material dislodged from the filter bags during the cleaning cycle is collected and landfilled in an appropriate facility. By landfilling the particulate mixture collected from the baghouse, there is substantial waste of costly germanium.

Technology exists and is commercially available for reclaiming germanium from particulate $GeO_2$. But, in the conventional facility using pre-coated bags and operated as described above, the concentration level of germanium in the material collected from the baghouse is insufficient for cost-effective reclamation. As a practical matter, a minimum concentration of 2% germanium by weight is ordinarily required.

SUMMARY OF THE INVENTION

In accordance with the present invention, it has been discovered that by appropriate adaptation of the manufacturing facility design and operation, it is possible to collect a substantial portion of the heretofore wasted germanium in sufficient concentration to permit cost-effective reclamation. In particular, it has been discovered that by modifying the baghouse to use filtration bags having a PTFE (polytetrafluoroethylene) filter membrane supported on a PTFE backing fabric, and by dedicating the glass production system connected to the baghouse to the production of blanks having sufficient germanium concentration, it is possible to obtain a particulate mixture from the baghouse that meets or exceeds the aforementioned 2% level. For example, in a preferred mode of the invention to described in detail later, the production system is constituted by lathes which are dedicated predominantly to the production of blanks for use in making multi-mode optical fibers.

Briefly stated, in accordance with one of its broader aspects, the invention provides a glass manufacturing facility which comprises a glass production system providing an exhaust stream entrained with particulate material including germanium-containing particulate, and an exhaust filtration system including PTFE membrane filter material supported by PTFE fabric material, the exhaust filtration system being connected to the glass production system to receive the exhaust stream and capture the particulate material. The facility additionally comprises a collection system connected to the exhaust filtration system to collect the captured particulate material from the exhaust filtration system. The glass production system operates to produce glass selected such that the concentration of germanium in the particulate material collected by the collection system is at least about 2% by weight.

In a related aspect, the invention provides an operation method of a glass manufacturing facility, which comprises producing glass with a glass production system that provides an exhaust stream entrained with particulate material including germanium-containing particulate, filtering the exhaust stream with an exhaust filtering system including PTFE membrane filter material supported by PTFE fabric material, thereby capturing the particulate material, and collecting the captured particulate material from the exhaust filtration system with a collection system. As previously stated, the glass is selected such that the concentration of germanium in the particulate material collected by the collection system is at least about 2 1% by weight.

BRIEF DESCRIPTION OF THE DRAWINGS

The aforementioned and additional aspects of the invention will be better understood from the following detailed description taken in conjunction with the accompanying drawings, in which.

DESCRIPTION OF THE PREFERRED EMBODIMENTS

Figure 1:
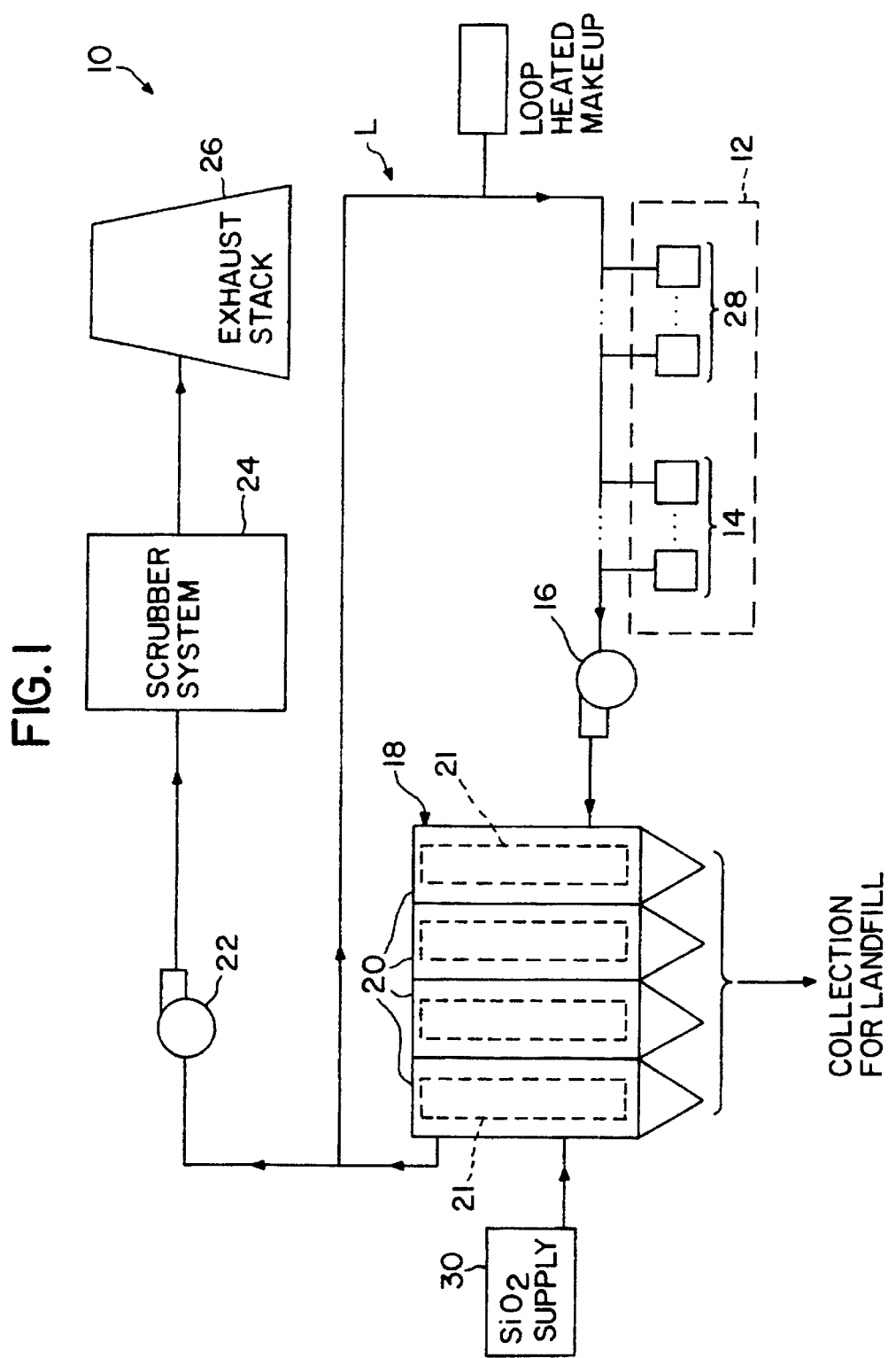
FIG. 1 is a block diagram showing of a conventional glass manufacturing facility for germanium-containing glass.
Figure 2:
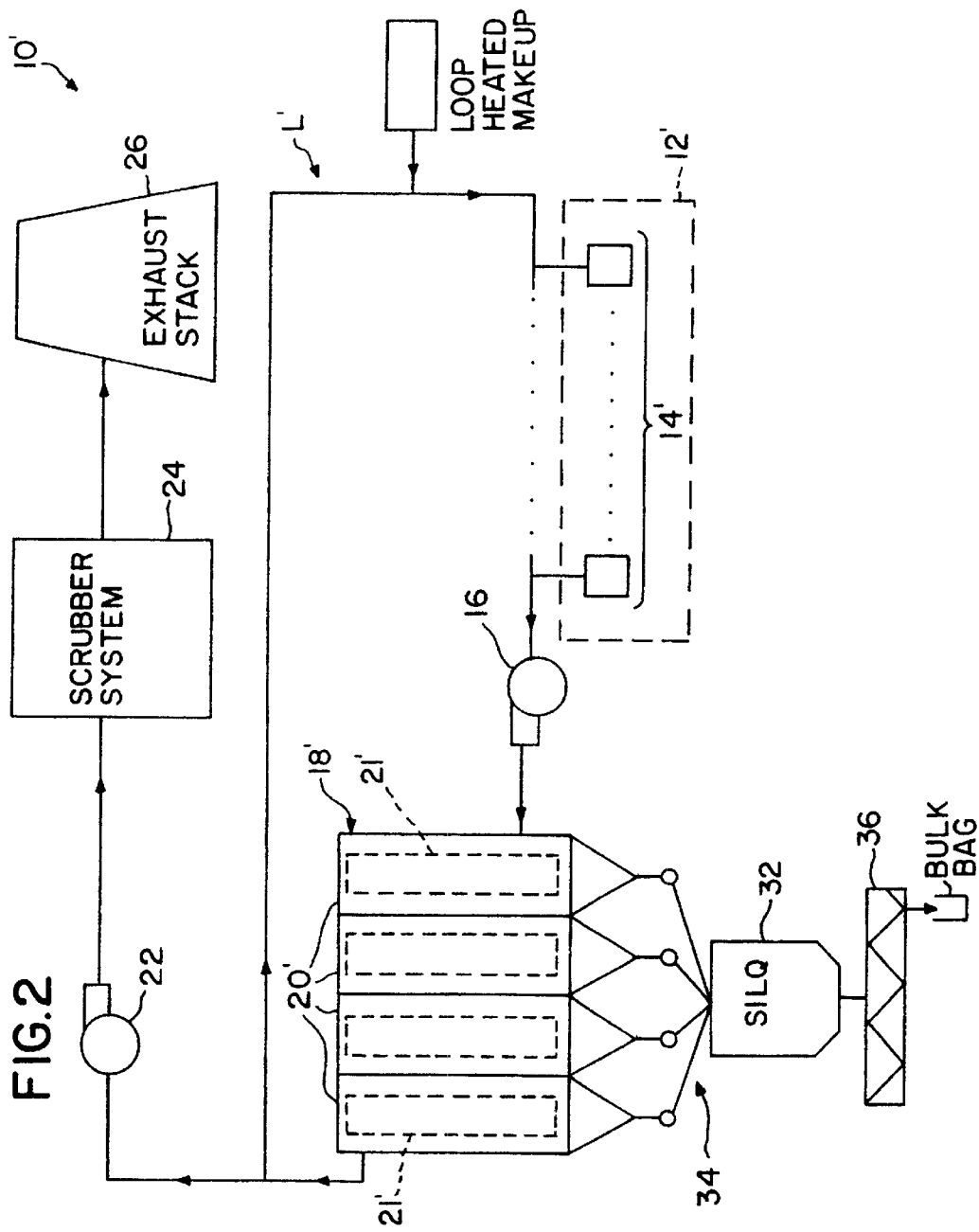
FIG. 2 is a block diagram of a glass manufacturing facility according to the present invention.

FIG. 2 diagrammatically depicts a glass manufacturing facility 10' in accordance with the present invention. The basic layout of this facility is similar to that of the facility 10 shown in FIG. 1, except that no $SiO_2$ supply system is provided for the baghouse 18'. Beyond the absence of this system, the principal differences from the conventional facility relate to the baghouse 18' and the glass production system 12'. These differences are addressed below. As will also be explained, the particulate collection system for the baghouse is designed to package the particulate in appropriate form for shipment to the germanium reclamation service provider.

Baghouse 18' in the facility of FIG. 2 is a modification of the conventional baghouse previously described, in which the standard pre-coated acrylic filtration bags are replaced with bags 21' constructed from a PTFE filtration laminate. The laminate material comprises, more particularly, an expanded PTFE filtration membrane (e.g., 0.01 inch thickness) bonded to a PTFE backing fabric that supports the membrane. The laminate material is commercially available under the trademark GORETEX from W. L. Gore & Associates, Inc., Elkton, Maryland. This material has been found to exhibit excellent resistance to the high-temperature, acidic environment in the loop L', and to capture soot particles, such as $SiO_2$ and $GeO_2$ in the earlier-mentioned size ranges with satisfactory efficiency.

Optimum cleaning of the PTFE filtration laminate bags may require that increased cleaning energy be imparted to the bags during the cleaning cycle. This can be accomplished by adjusting the shake amplitude and frequency imparted to the bags by the mechanical shake system incorporated in the baghouse modules. Sonic horns may also be installed in the baghouse modules to increase the cleaning energy to the bags.

Because the PTFE laminate bags do not require $SiO_2$ pre-coating, it becomes possible to substantially reduce the concentration of $SiO_2$ in the particulate material collected from the baghouse, thus effectively increasing the concentration of $GeO_2$, and therefore, germanium. To further increase the concentration of $GeO_2$ in the collected material, the glass production system 12' is modified from the conventional system such that preferably all of the lathes are dedicated to the production of $GeO_2$-doped silica glass blanks.

The glass (or glasses) produced on the lathes 14' is (are) preferably selected such that the resulting exhaust stream from the lathes will provide a sufficient amount of $GeO_2$ such that the germanium concentration in the material collected from the baghouse is at least 2% in order to allow for reclamation of the germanium. A sightly lower concentration may be acceptable in some applications, however. The $GeO_2$ content of the exhaust stream from the lathes may vary, provided that the average content over a suitable period of time, such as the interval between cleaning cycles, yields the desired concentration of germanium in the particulate collected from the baghouse.

Another modification related to the baghouse involves the so-called air-to-cloth ratio, which is defined as the ratio of nominal volumetric air flow through the baghouse in actual cubic feet per minute to the total on-line filter cloth area of the baghouse in square feet. It has been determined that the PTFE laminate bags do not tolerate as high an air-to-cloth ratio as the conventional pre-coated filter bags in the environment of the invention. This factor should be taken into consideration in the overall facility design, because when an individual baghouse module is taken off-line during a cleaning cycle or a service outage, for example, the air-to-cloth ratio of the modules remaining in operation will be increased correspondingly. In other words, the remaining modules bear the load of the module taken off-line.

Generally speaking, the PTFE laminate bags should not be subjected to sustained operation at an air-to-cloth ratio exceeding 1.1. Sustained operation above this ratio may cause excessive wear of the PTFE membrane and/or excessive caking of particulate on the bag material such that it cannot be adequately cleaned.

The air-to-cloth ratio for normal operation (all modules on-line) is therefore preferably set such that when the modules are individually off-line, the air-to-cloth ratio of the remaining modules does not exceed 1.1. More preferably, the setting is such that the ratio of the remaining modules does not exceed 0.9. The capacity of the baghouse and/or the number of lathes connected to the baghouse may be determined as needed to attain an appropriate ratio.

Returning now to FIG. 2, the baghouse particulate collection system includes a silo 32 which is connected to hoppers at the respective bases of the baghouse modules via a pneumatic transport system 34. The pneumatic transport system transports particulate material dislodged from the PTFE filter bags during the cleaning cycle for collection in the silo. The silo feeds a mixer 36, where the collected particulate material is mixed with water from a water spray to compact it, whereupon it is dropped into bulk bags for shipment to the germanium reclamation service provider (for reclamation in the form of $GeCl_4$). The water spray furnishes only such an amount of water that is sufficient to compact the particulate without forming hard nodules, which are undesirable for reclamation. The compacted material thus remains substantially dry.

EXAMPLE

A glass manufacturing facility as shown in FIG. 2 was constructed and operated in accordance with the following parameters:

Lathes: 6 lathes operated to produce $GeO_2$-doped silica glass blanks with a predominance of blanks for multi-mode optical fiber and a balance of blanks for dispersion-shifted optical fiber Baghouse Construction:

Number of baghouse modules—4 (same construction)

Bag material—GORETEX PTFE laminate (0.01 in. membrane thickness)

Bag size—5 in. diameter, 14 feet long

Cleaning Cycle—Every 10–18 hours depending on production conditions (total shake time 7 minutes per module)

Total bag (cloth) area—20,888 sq. feet

Flowing Temp./Baghouse Inlet Temp.: 190° F.

Loop Nominal Volumetric Flow Rate (@ 190° F.): 10,500 scfm; 12,877 acfm

Permissible Loop Temp. Range: 140–250° F. (dew point @ 130°F.)

Range of Air-to-Cloth Ratio:

All modules on-line—0.57 @ 140° F. to 0.67 @ 250°F.

One module off-line—0.76 @ 140° F. to 0.90 @ 250°F.

$GeO_2$ Concentration of Collected Particulate at Mixer Output (per 400 lb. particulate batch, dry weight basis): 2.7–6.7% by wt. depending on glass production mix It is to be understood, of course, that the preferred modes of the invention described above are merely exemplary and that various implementations are possible in keeping with the scope of the invention as defined in the appended claims.

We claim as our invention:

1. A glass manufacturing facility, comprising:
    a glass production system providing an exhaust stream entrained with particulate material including germanium-containing-particulate;
    an exhaust filtration system including PTFE membrane filter material supported by PTFE fabric material, said exhaust filtration system being connected to said glass production system to receive said exhaust stream and capture said particulate material; and
    a collection system connected to said exhaust filtration system to collect the captured particulate material from said exhaust filtration system,
    said glass production system operating to produce glass selected such that the concentration of germanium in the particulate material collected by said collection system is at least about 2% by weight.

2. A glass manufacturing facility according to claim 1, wherein said germanium-containing particulate is $GeO_2$.

3. A glass manufacturing facility according to claim 2, wherein the $GeO_2$ particle size is in a range from 0.05–0.5 $\mu$m.

4. A glass manufacturing facility according to claim 1, wherein the glass produced by said glass production system is $GeO_2$-doped silica glass and said particulate material includes $SiO_2$ and $GeO_2$.

5. A glass manufacturing facility according to claim 4, wherein the $GeO_2$ particle size is in a range from 0.05–0.5 $\mu$m and the $SiO_2$ particle size is in a range from 0.5–1 $\mu$m.

6. A glass manufacturing facility according to claim 5, wherein said glass production system includes a plurality of lathes that produce blanks for the production of optical fiber.

7. A glass manufacturing facility according to claim 1, wherein said exhaust filtration system is a baghouse system including a plurality of baghouse modules using filter bags of a construction in which a PTFE filter membrane is supported on a PTFE fabric backing, and the air-to-cloth ratio of said baghouse system is set such that when said modules are individually off-line, the air-to-cloth ratio of the remaining modules is less than or equal to 1.1.

8. A glass manufacturing facility according to claim 7, wherein the air-to-cloth ratio of said baghouse system is set such that when said modules are individually off-line, the air-to-cloth ratio of the remaining modules is less than or equal to 0.9.

9. A glass manufacturing facility according to claim 7, wherein said glass production system includes a plurality of lathes that produce $GeO_2$-doped silica glass blanks for the production of optical fibers, and the particulate material includes $SiO_2$ and $GeO_2$.

10. A glass manufacturing facility according to claim 9, wherein the $Geo_2$ particle size is in a range from 0.05–0.5 $\mu$m and the $SiO_2$ particle size is in a range from 0.5–1 $\mu$m.

11. A glass manufacturing system according to claim 1 wherein said collection system comprises a mechanical shaking system.

12. An operation method of a glass manufacturing facility, said method comprising:
    producing glass with a glass production system that provides an exhaust stream entrained with particulate material including germanium-containing particulate;
    filtering the exhaust stream with an exhaust filtering system including PTFE membrane filter material supported by PTFE fabric material, thereby capturing said particulate material; and
    collecting the captured particulate material from said exhaust filtration system with a collection system,
    wherein the glass is selected such that the concentration of germanium in the particulate material collected by said collection system is at least about 2% by weight.

13. A method according to claim 12, wherein said germanium-containing particulate is $GeO_2$.

14. A method according to claim 13, wherein the $GeO_2$ particle size is in a range from 0.05–0.5 $\mu$m.

15. A method according to claim 13, wherein the glass produced by said glass production system is $GeO_2$-doped silica glass and said particulate material includes $SiO_2$ and $GeO_2$.

16. A method according to claim 15, wherein the $GeO_2$ particle size is in a range from 0.05–0.5 $\mu$m and the $SiO_2$ particle size is in a range from 0.5–1 $\mu$m.

17. A method according to claim 16, wherein said producing includes operating a plurality of lathes to produce $GeO_2$-doped silica glass blanks for the production of optical fiber.

18. A method according to claim 12, wherein said exhaust filtration system is a baghouse system including a plurality of baghouse modules using filter bags of a construction in which a PTFE filter membrane is supported on a PTFE fabric backing, and said filtering includes setting the air-to-cloth ratio of said baghouse system such that when said modules are individually off-line, the air-to-cloth ratio of the remaining modules is less than or equal to 1.1.

19. A method according to claim 18, wherein the air-to-cloth ratio of said baghouse system is set such that when said modules are individually off-line, the air-to-cloth ratio of the remaining modules is less than or equal to 0.9.

20. A method according to claim 18, wherein said producing includes operating a plurality of lathes to produce $GeO_2$-doped silica glass blanks for the production of optical fiber, and the particulate material includes $SiO_2$ and $GeO_2$.

21. A method according to claim 20, wherein the $GeO_2$ particle size is in a range from 0.05–0.5 $\mu$m and the $SiO_2$ particle size is in a range from 0.5–1 $\mu$m.

22. A method according to claim 12 wherein said collecting comprises a mechanical shaking system.

23. A method according to claim 12 wherein said collecting comprises mechanically shaking said PTFE membrane filter material.

24. A method according to claim 23 wherein said collecting further comprises cleaning energy from at least one sonic horn.

* * * * *